US012564291B2

(12) United States Patent
Fox et al.

(10) Patent No.: US 12,564,291 B2
(45) Date of Patent: Mar. 3, 2026

(54) METHOD OF OPERATING A STAND MIXER

(71) Applicant: Haier US Appliance Solutions, Inc.,
Wilmington, DE (US)

(72) Inventors: Steven Fox, Louisville, KY (US);
Daniel Carballo, Louisville, KY (US);
Eric Matthew Lewis, Louisville, KY
(US); Bobby Lee Lindsey, Louisville,
KY (US); Tomas Garces, Louisville,
KY (US)

(73) Assignee: Haier US Appliance Solutions, Inc.,
Wilmington, DE (US)

( * ) Notice: Subject to any disclaimer, the term of this
patent is extended or adjusted under 35
U.S.C. 154(b) by 890 days.

(21) Appl. No.: 17/719,810

(22) Filed: Apr. 13, 2022

(65) Prior Publication Data
US 2023/0329483 A1     Oct. 19, 2023

(51) Int. Cl.
*A47J 43/07*        (2006.01)
*A47J 43/044*       (2006.01)
(52) U.S. Cl.
CPC ......... *A47J 43/0705* (2013.01); *A47J 43/044*
(2013.01); *A47J 2043/04454* (2013.01)
(58) Field of Classification Search
CPC .................. A47J 43/0705; A47J 43/044; A47J
2043/04454; B01F 35/2115; B01F
35/2117; B01F 35/212; B01F 35/2216;
B01F 35/22161
See application file for complete search history.

(56) References Cited

U.S. PATENT DOCUMENTS

| | | | |
|---|---|---|---|
| 2009/0110788 A1* | 4/2009 | Ciancimino | .......... B01F 27/805 |
| | | | 366/142 |
| 2018/0116467 A1* | 5/2018 | Ciepiel | .................. A47J 43/07 |
| 2018/0369770 A1* | 12/2018 | Brzezowsky | ......... B01F 35/213 |
| 2019/0246843 A1 | 8/2019 | Yan et al. | |
| 2019/0254481 A1* | 8/2019 | Frielinghaus | ....... B01F 35/2117 |
| 2020/0229647 A1 | 7/2020 | Hack et al. | |
| 2022/0265092 A1* | 8/2022 | Lowes | .................. G06F 1/1637 |
| 2023/0284836 A1* | 9/2023 | Westwood | ........... A47J 43/0711 |

FOREIGN PATENT DOCUMENTS

| | | | | |
|---|---|---|---|---|
| EP | 3142531 B1 | 3/2021 | | |
| JP | 2001095408 A | 4/2001 | | |
| JP | 2020020760 A | 2/2020 | | |
| WO | WO-2022269242 A1 * | 12/2022 | .......... | A47J 43/0705 |

* cited by examiner

*Primary Examiner* — Marc C Howell
(74) *Attorney, Agent, or Firm* — Dority & Manning, P.A.

(57)            ABSTRACT

A method for operating a stand mixer includes receiving, at
a controller of the stand mixer, a signal indicative of a
parameter of food contents in the stand mixer, and receiving,
at the controller of the stand mixer, a signal indicative of an
operating parameter of a motor of the stand mixer while the
motor operates to mix the food contents. Then, determining,
at the controller of the stand mixer, that a mixing operation
of the stand mixer is complete based at least in part of one
of the signal indicative of the parameter of the food contents,
the signal indicative of the operating parameter of the motor,
and time. Then adjusting, with the controller of the stand
mixer, operation of the motor when the mixing operation is
complete.

20 Claims, 2 Drawing Sheets

METHOD OF OPERATING A STAND MIXER

FIELD OF THE INVENTION

The present subject matter relates generally to methods of operating stand mixers.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. Operating a stand mixer is frequently a manual process, which involves the user actively monitoring the mixing process. Thus, during the mixing process, a user is positioned close to the mixer in order to monitor the content doneness and to turn-off the stand mixer when the desired doneness is reached. In certain mixing processes, such as whipping cream or kneading dough, the mixing product can become undesirable due to overworking, e.g., overwhipping or excessive kneading, if the user is not actively present. For a user, actively monitoring the stand mixer during the mixing process can be tedious and inconvenient.

BRIEF DESCRIPTION OF THE INVENTION

Aspects and advantages of the invention will be set forth in part in the following description, or may be apparent from the description, or may be learned through practice of the invention.

In an example embodiment, a stand mixer includes a housing that includes a base, a column mounted to the base, and a head mounted to the column. The head extending outwardly above the base. Additionally, a motor is disposed within the housing. A scale is mounted to the housing, and a controller is disposed within the housing. A switch is coupled to the controller, and the switch is configured to selectively activate the motor in response to user actuation of the switch. A relay is also coupled to the controller, and the relay is configured to selectively deactivate the motor. Additionally, one or more sensors are in communication with the controller, and the controller is configured to receive a signal indicative of a parameter of food contents in the stand mixer from a first sensor of the one or more sensors. Also, the controller is configured to receive a signal indicative of an operating parameter of the motor from a second sensor of the one or more sensors when the motor operates to mix the food contents. The controller is configured to compute a stopping time based at least in part on the signals from the first and second sensors. The parameter of food contents and the operating parameter of the motor includes two or more of weight, viscosity, time, temperature, altitude, speed, and electrical current.

A method for operating a stand mixer includes receiving, at a controller of the stand mixer, a signal indicative of a parameter of food contents in the stand mixer, and receiving, at the controller of the stand mixer, a signal indicative of an operating parameter of a motor of the stand mixer while the motor operates to mix the food contents. Then, determining, at the controller of the stand mixer, that a mixing operation of the stand mixer is complete based at least in part of one of the signal indicative of the parameter of the food contents, the signal indicative of the operating parameter of the motor, and time. Further, adjusting, with the controller of the stand mixer, operation of the motor when the mixing operation is complete.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
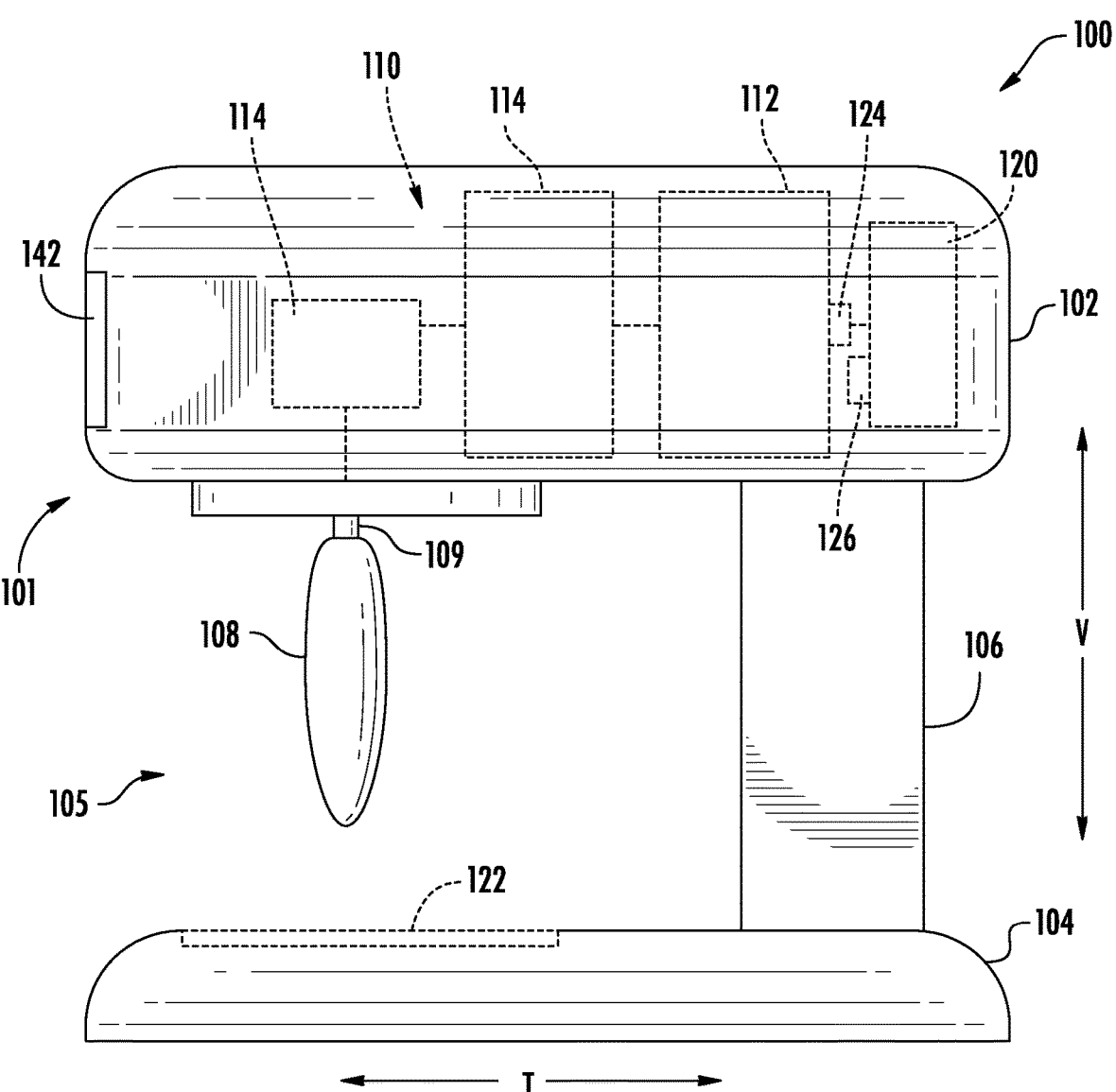
FIG. 1 provides a side section view of a stand mixer according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments. Moreover, stand mixer 100 of FIG. 1 defines a vertical direction V and a transverse direction T, which are perpendicular to each other. It should be understood that these directions are presented for example purposes only, and that relative positions and locations of certain aspects of stand mixer 100 may vary according to specific embodiments, spatial placement, or the like.

Stand mixer 100 may include a casing 101. In detail, casing 101 may include a motor housing 102, a base 104, and a column 106. Motor housing 102 may house various mechanical and/or electrical components of stand mixer 100, which will be described in further detail below. For example, as shown in FIG. 1, a motor 112, a planetary or reduction gearbox 114, and a bevel gearbox 116 may be disposed within motor housing 102. Base 104 may support motor housing 102. For example, motor housing 102 may be mounted (e.g., pivotally) to base 104 via column 106, e.g., that extends upwardly (e.g., along the vertical direction V) from base 104. Motor housing 102 may be suspended over a mixing zone 105, within which a mixing bowl may be disposed and/or mounted to base 104.

A drivetrain 110 may be provided within motor housing 102 and is configured for coupling motor 112 to a shaft 109 (e.g., a mixer shaft), such that shaft 109 is rotatable via motor 112 through drivetrain 110. Drivetrain 110 may include planetary gearbox 114, bevel gearbox 116, etc. Mixer shaft 109 may be positioned above mixing zone 105 on motor housing 102, and an attachment 108, such as a beater, whisk, or hook, may be removably mounted to mixer shaft 109. Attachment 108 may rotate within a bowl (not shown) in mixing zone 105 to beat, whisk, knead, etc. material within the bowl during operation of motor 112.

As noted above, motor 112 may be operable to rotate mixer shaft 109. Motor 112 may be a direct current (DC) motor in certain example embodiments. In alternative example embodiments, motor 112 may be an alternating current (AC) motor. Motor 112 may include a rotor and a stator. The stator may be mounted within motor housing 102 such that the stator is fixed relative to motor housing 102, and the rotor may be coupled to mixer shaft 109 via drivetrain 110. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 110 may be configured to provide a rotational speed reduction and mechanical advantage between motor 112 and mixer shaft 109.

Stand mixer 100 may include a controller 120 provided within casing 101. In detail, controller 120 may be located within motor housing 102 of casing 101. For instance, controller 120 may be a microcontroller, as would be understood, including one or more processing devices, memory devices, or controllers. Controller 120 may include a plurality of electrical components configured to permit operation of stand mixer 100 and various components therein (e.g., motor 112). For instance, controller 120 may be a printable circuit board (PCB), as would be well known.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 120 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 120 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 120 may be operable to execute programming instructions or micro-control code associated with an operating cycle of stand mixer 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 120 as disclosed herein is capable of and may be operable to perform any methods, method steps, or portions of methods as disclosed herein. For example, in some embodiments, methods disclosed herein may be embodied in programming instructions stored in the memory and executed by controller 120. According to still other example embodiments, a user interface 142 may include one or more microprocessors and/or one or more memory devices. Accordingly, certain components of stand mixer 100 may be controlled directly from user interface 142.

The memory devices may also store data that can be retrieved, manipulated, created, or stored by the one or more processors or portions of controller 120. The data can include, for instance, data to facilitate performance of methods described herein. The data can be stored locally (e.g., on controller 120) in one or more databases and/or may be split up so that the data is stored in multiple locations. In addition, or alternatively, the one or more database(s) can be connected to a remote user interface (not shown) through any suitable network(s), such as through a high bandwidth local area network (LAN) or wide area network (WAN). In this regard, for example, controller 120 may further include a communication module or interface that may be used to communicate with one or more other component(s) of stand mixer 100, controller 120, an external appliance controller, an external device, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Controller 120 may be in communication with various sensors and a relay 126. In the present example embodiment, shown in FIG. 1, the various sensors may include a scale 122 and a current sensor 124. Controller 102 may receive signal(s) from scale 122 corresponding to a weight measurement, e.g., of the bowl and materials therein. Scale 122 as shown is an integrated scale within base 104 and is provided for example purposes only. One skilled in the art would appreciate that scale 122 may be another type of scale, e.g., a side scale, a drop scale, or a manual weight selection knob. It will be understood that stand mixer 100 need not include scale 122 in certain example embodiments. Current sensor 124 may be any suitable type of current sensor, e.g., a Hall effect current sensor or a current sensing resistor, etc. Controller 102 may receive signal(s) from current sensor 124 corresponding to a current supplied to motor 112, e.g., during mixing of materials within the bowl. Controller 120 may also be in operative communication with or otherwise be connected to relay 126, which is connected to motor 112. Relay 126 may be configured such that when a criterion, or a value, for doneness is reached, a signal is sent to the controller 120, thus adjusting or switching-off motor 112 via relay 126. The values for doneness and signals are described in further detail herein.

Controller 120 is configured to acquire a signal indicative of a parameter of food contents in the stand mixer 100, such as weight from scale 122, as well as a signal indicative of an operating parameter of motor 112, such as current from current sensor 124, while the motor 112 operates to mix the food contents during a mixing process. Controller 120 may be configured to reacquire the values repeatedly throughout the operation of the stand mixer 100. When the values of the parameter of food contents and the operating parameter from the sensors are received at controller 120, controller 120 may be configured to compute a stopping time for the mixing process based at least in part upon the values of the parameter of food contents and the operating parameter. These values may include, but are not meant to be limited to, weight of the food contents, viscosity of the food contents, time, temperature of the food contents, altitude, mixing speed, and electrical current to motor 112.

The process may be initiated by a user by either manually pressing a switch on user interface 142, or using an external device, such as a smartphone, wirelessly connected to controller 120 in the stand mixer 100. The switch may be an electromagnetic switch or servo switch. When the process is initiated, an overall mixing run timer may also be started by controller 120. The overall mixing run timer may include an upper and a lower limit. The mixing process may run through the process as described above, repeatedly checking for a value to be met, or if no value is met when the overall run timer upper limit expires, the operation may be terminated to further prevent over processing of the food contents. For example, the user may enter the quantity and/or type of food contents on user interface 142, or on an external device, and start the mixing process. Using controller 120, current sensor 124, and relay 126, controller 120 may continuously monitor time and current to adjust or stop the mixing process at the desired doneness for the food contents. In other example embodiments, controller 120 may also monitor, or take into consideration, ingredient temperature, mixer temperature, and/or altitude.

Figure 2:
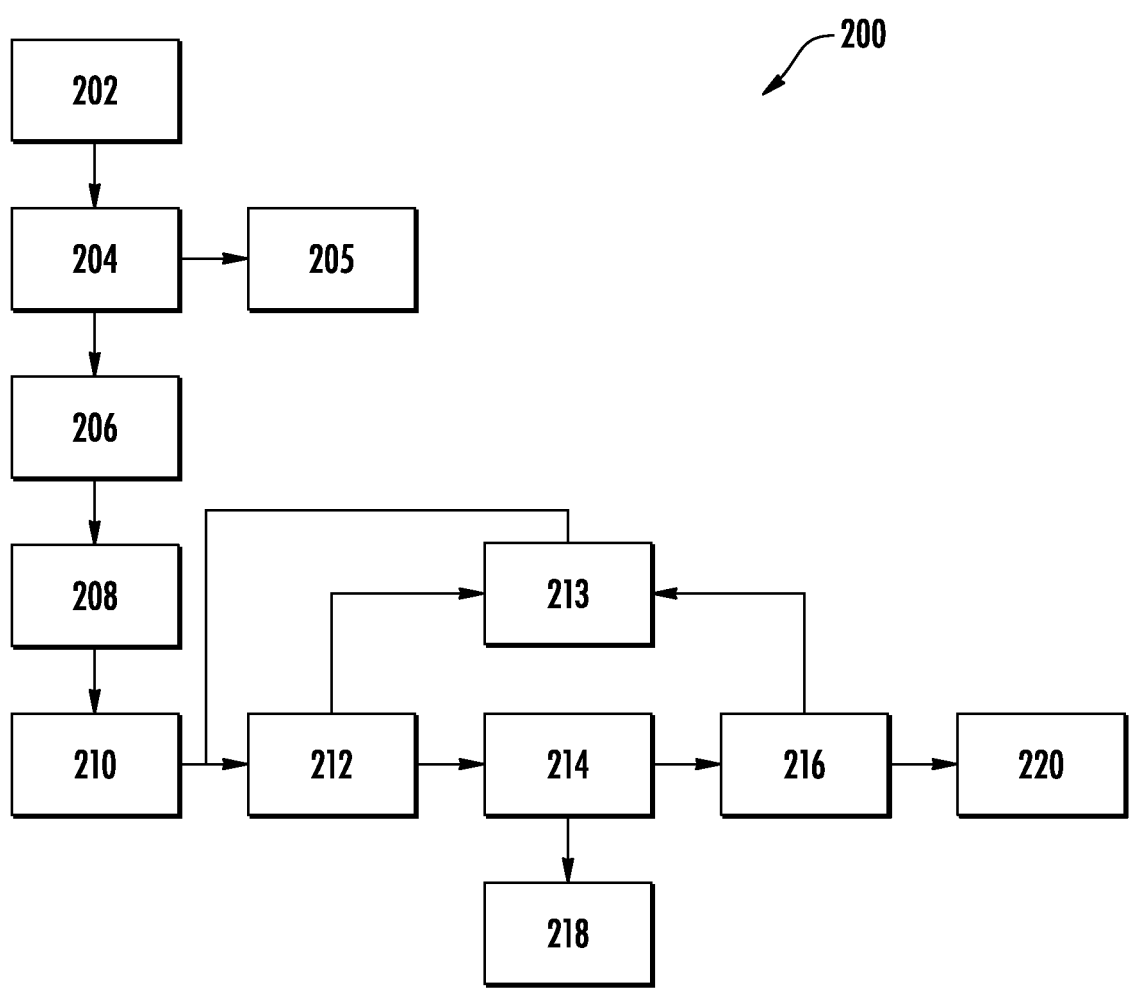
FIG. 2 provides a method of operating a stand mixer according to an example embodiment of the present disclosure.

FIG. 2 illustrates a method 200 of operating stand mixer 100. At 202, a user activates or initiates the stand mixer 100. For example, to initiate the stand mixer 100, the user may push a button on user interface 142 or may use an external device, such as a smartphone that is wirelessly connected to controller 120. The type of food content, or ingredient type, may be input at 202 during the initialization at 202, e.g., whipped cream, cookie dough, or other food items may be input as the type of food contents. Once initiated, at 204 controller 120 may receive a signal indicative of a parameter of the food contents. For example, scale 122 may tare and weigh the food contents, and the value will be received by controller 120. At 205, if there are no food contents in stand mixer 100, stand mixer 100 may terminate the operation. At 206, after the food contents are weighed, controller 120 may calculate the overall runtime limit. For example, if the user is making whipped cream, a formula for an overall runtime limit for whipped cream may be programmed into controller 120. Whipped cream is provided for example purposes only, and it should be understood that formulas for other food contents may be programmed to controller 120 as well. The overall runtime limit may be a default maximum run time stored within controller 120 for each type of food content. For instance, the formula for the overall runtime limit of various types of food items may be saved within the memory of controller 120 or a lookup table of overall runtime limits for the various types of food items may be saved within the memory of controller 120. At 208, controller 120 may calculate the current draw from the motor 112, which may indicate doneness of the mixing process. Similarly to the runtime limit, a formula may be programmed to controller 120 that calculates the desired current based upon the previously acquired values. The current draw from the motor 112 may be a default value stored within controller 120 for each type of food content. For instance, the current draw for various types of food items may be saved within the memory of controller 120 or a lookup table of current draws for the various types of food items may be saved within the memory of controller 120.

At 210, controller 120 starts the mixing process, and the overall timer begins counting down. Between 212, 213, 214, and 216 is the iterative, repeated process of controller 120 reacquiring the values repeatedly throughout the operation. At 212, the overall run time lower limit is checked. If the lower limit is not met, the process continues mixing at 213. From 213, the process returns to 212 to check again if the lower limit is met. Once the lower limit is met, the process proceeds to 214.

At 214, controller 120 checks the signal indicating an operating parameter, in the present example embodiment, the current measurement from current sensor 124. For example, controller 120 checks the current measurement from current sensor 124 to the value calculated at 208, and if the current measurement does not meet the desired value, the process proceeds to 216. If the current has met the calculated value from 208 at 214, then the process moves to 218. At 218, the process is complete and controller 120 stops motor 112. At 216, the overall run time upper limit is checked. If the upper limit is not met, the process continues mixing at 213. Returning to 216, if the minimum timer at 212 has been met, the current at 214 has not been met, and the overall run time upper limit is expired, the process moves to 220. At 220, the process is complete and controller 120 stops motor 112.

In one example, a user is making cookie dough. The user initializes the stand mixer 100 and inputs the ingredients to the stand mixer at 202. The controller 120 weighs the ingredients at 204 and calculates the overall run time upper and lower limits at 206. At 208, controller 120 calculates the current necessary for completed cookie dough. At the conclusion of 208, the stand mixer begins mixing at 210, activating the timer. At 212, controller 120 checks the timer and the lower limit of the timer is met. Then at 214, controller 120 checks the current, which has met the calculated value at 208. Thus, at 218, the mixing process is complete and motor 112 is stopped by controller 120. The cookie dough has been automatically mixed to the desired doneness.

In another example, a user is making whipped cream. The user initializes the stand mixer and inputs the ingredients to the stand mixer 100 at 202. The controller 120 weighs the ingredients at 204 and calculates the overall run time upper and lower limits at 206. At 208, controller 120 calculates the current necessary for completed whipped cream. At the conclusion of 208, the stand mixer begins mixing at 210, activating the timer. At 212, controller 120 checks the timer and the lower limit of the timer is met. Then at 214, controller 120 checks the current, which has not met the calculated value at 208. At 216, controller 120 checks the timer and the upper limit has been met, or, in other words, the timer has expired. Thus, at 220, the mixing process is complete and motor 112 is stopped by controller 120. The whipped cream has been automatically mixed to the desired doneness.

As may be seen from the above examples, controller 120 may receive a signal indicative of a parameter of food contents in the stand mixer 100 at 204. Then controller 120 may receive a signal indicative of an operating parameter of a motor 112 of the stand mixer 100 while the motor 112 operates to mix the food contents at 214. Following the reception of these values, controller 120 determines that a mixing operation of the stand mixer 100 is complete based at least in part on the signal indicative of the parameter of the food contents, the signal indicative of the operating parameter of the motor at 214, or time at 216. Upon reaching the determination of a completed process, controller 120 adjusts the operation of the motor 112 to end the mixing process at either 218 or 220.

FIG. 2 depicts steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure. Other embodiments may include other sensors such as a barometer, or a thermocouple. Moreover, although aspects of method 200 is explained using stand mixer 100 as an example, it should be appreciated that the method may be applied to the operation of any suitable stand mixer.

As seen from the above, the user may enter the quantity and/or type of food contents on user interface 142, or on an external device, and start the mixing process. Controller 120 then calculates the values for automatically mixing the food contents to completion. Then controller 120 continuously monitors current sensor 124 to monitor the current usage of motor 112, in order to adjust or stop the process at the desired doneness for the food contents. Controller 120 also monitors the overall time spent in the mixing process to avoid under or over mixing the food contents. Upon the overall time exceeding a calculated value, controller 120 adjusts motor 112 off to complete the mixing process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer, comprising:
a housing that comprises a base, a column mounted to the base, and a head mounted to the column and extending outwardly above the base; a motor disposed within the housing;
a drivetrain comprising a gearbox coupled to the motor and a mixer shaft coupled to the gearbox, the mixer shaft perpendicularly coupled to the gearbox with respect to the motor;
an attachment coupled to the mixer shaft, the attachment configured to one of beat, whisk, or knead;
a scale mounted to the housing;
a controller disposed within the housing;
a switch coupled to the controller, the switch configured to selectively activate the motor in response to user actuation of the switch;
a relay coupled to the controller, the relay configured to selectively deactivate the motor; and
a plurality of sensors in communication with the controller,
wherein the controller is configured to receive a signal indicative of a parameter of food contents in the stand mixer from a first sensor of the plurality of sensors and a signal indicative of an operating parameter of the motor from a second sensor of the plurality of sensors when the motor operates to mix the food contents, the second sensor configured to measure torque of the drivetrain, and
wherein the controller is configured to compute a stopping time based at least in part on the signals from the first and second sensors, the parameter of food contents and the operating parameter of the motor comprising two or more of weight, viscosity, time, temperature, altitude, speed, and electrical current.

2. The stand mixer of claim 1, wherein the switch is one of an electromagnetic switch and a servo switch.

3. The stand mixer of claim 1, wherein the controller is configured for communication with a remote device.

4. The stand mixer of claim 2, wherein the switch is configured such that the mixing operation is initiated via manual actuation of the switch.

5. The stand mixer of claim 1, wherein the parameter of food contents is one or more of weight, ingredient type and ingredient temperature.

6. The stand mixer of claim 1, wherein the operating parameter of the motor is one or more of torque, speed, time, and mixer temperature.

7. The stand mixer of claim 1, wherein the signal indicative of the parameter of food contents, received at the controller, is received from one or both of a user input and the first sensor.

8. The stand mixer of claim 7, wherein the scale is one of an integrated scale, a weight selection knob, side scale, and a drop scale.

9. The stand mixer of claim 1, wherein the signal indicative of the operating parameter, received at the controller, is received from one or both of a user input and the second sensor, the second sensor comprising one or more of a current sensor, a barometer, and a thermocouple.

10. The stand mixer of claim 9, wherein the current sensor is one of a Hall-effect current sensor and a current sensing resistor.

11. A method for operating a stand mixer, the stand mixer comprising a drivetrain comprising a gearbox coupled to a motor and a mixer shaft coupled to the gearbox, the mixer shaft perpendicularly coupled to the gearbox with respect to the motor, and an attachment coupled to the mixer shaft, the attachment configured to one of beat, whisk, or knead, the method comprising:

receiving, at a controller of the stand mixer, a signal indicative of a parameter of food contents in the stand mixer;

receiving, at the controller of the stand mixer, a signal indicative of an operating parameter of a motor of the stand mixer while the motor operates to mix the food contents, the signal indicative of a torque of the drivetrain;

determining, at the controller of the stand mixer, that a mixing operation of the stand mixer is complete based at least in part of one or more of the signal indicative of the parameter of the food contents, the signal indicative of the operating parameter of the motor, and time;

adjusting, with the controller of the stand mixer, operation of the motor when the mixing operation is complete.

12. The method of claim 11, wherein the controller is configured for communication with a relay and a switch.

13. The method of claim 11, further comprising communicating with the controller of the stand mixer from a remote user interface.

14. The method of claim 11, further comprising initiating the mixing operation via one of an electromagnetic switch and a servo switch.

15. The method of claim 11, wherein the parameter of food contents is one or more of weight, ingredient type, and ingredient temperature.

16. The method of claim 11, wherein the operating parameter is one or more of speed, time, and mixer temperature.

17. The method of claim 11, wherein the signal indicative of the parameter of food contents, received at the controller, is received from one or both of a user input and a sensor, the sensor comprising one or both of a thermocouple and a scale.

18. The method of claim 17, wherein the scale is one of an integrated scale, a weight selection knob, side scale, and a drop scale.

19. The method of claim 11, wherein the signal indicative of the operating parameter, received at the controller, is received from one or both of a manual input and a sensor, the sensor comprising one or more of a current sensor, a barometer, and a thermocouple.

20. The method of claim 19, wherein the current sensor is one of a Hall-effect current sensor and a current sensing resistor.

* * * * *